Aug. 9, 1932.  W. J. SMITH ET AL  1,871,227

FLEXIBLE COUPLING

Filed Aug. 29, 1928

Inventor
William J. Smith
Herman F. Braun
By Hull Broch & West Attorney

UNITED STATES PATENT OFFICE

WILLIAM J. SMITH AND HERMAN F. BRAUN, OF LAKEWOOD, OHIO, ASSIGNORS TO THE CLEVELAND STEEL PRODUCTS CORPORATION, OF CLEVELAND, OHIO, A CORPORATION OF OHIO

FLEXIBLE COUPLING

Application filed August 29, 1928. Serial No. 302,755.

This invention relates generally to a flexible coupling member or universal joint for forming a driving connection between two shafts and the main object of the invention is to produce a joint which is simple in construction, capable of production in an extremely economical and efficient manner and which requires very little lubrication and at the same time will be free from defects affecting the practicable and continuous operation of such joints.

Figure 1:
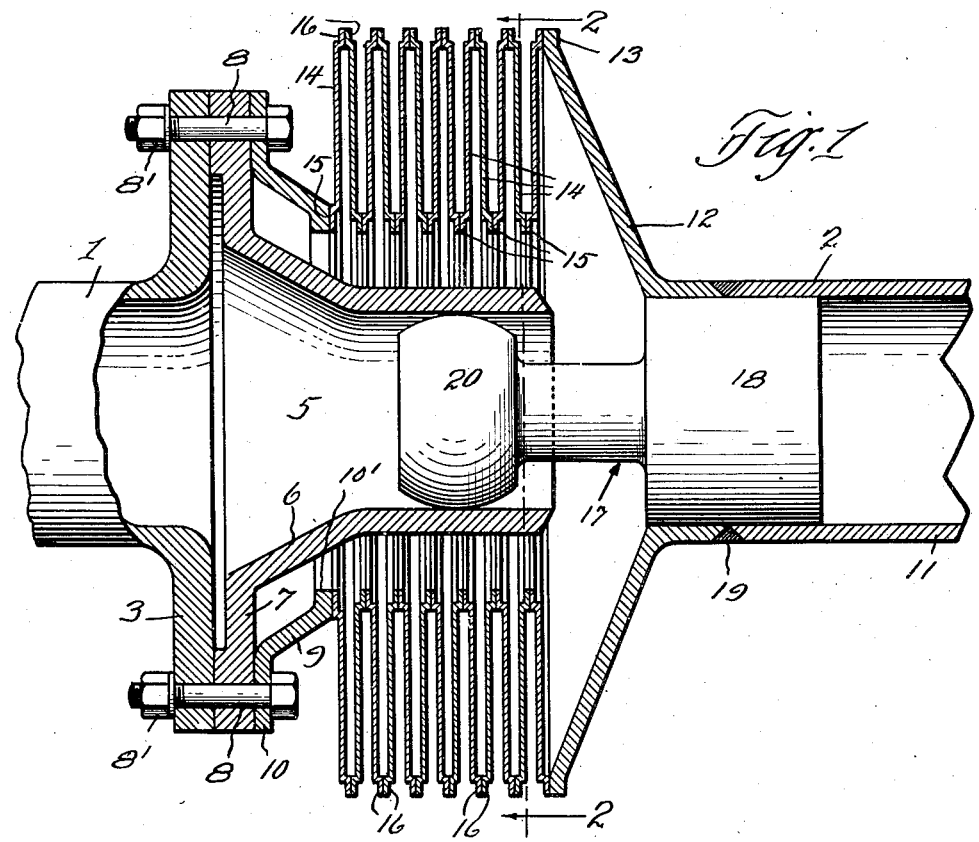
Figure 2:
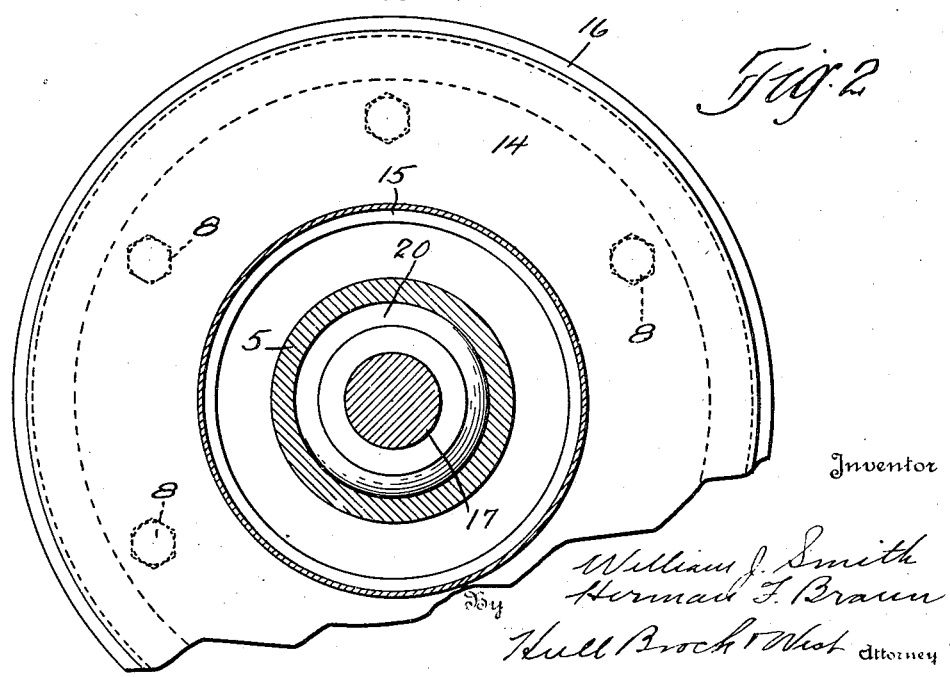

Further and more limited objects of the invention will appear as the description proceeds and by reference to the accompanying drawing in which Fig. 1 is a vertical sectional view illustrating the preferred embodiment of our invention and Fig. 2 is a vertical sectional view on the line 2—2 of Fig. 1.

Referring now to the drawing, the reference characters 1 and 2 denote a pair of hubs adapted to be rigidly connected with the opposed ends of a pair of shaft sections between which a driving connection is to be provided. The hub 1 has a peripheral flange 3 to which is rigidly connected an annular member 5 having a tapered portion 6 terminating in a peripheral flange 7. The hub 1 and annular member 5 are secured together by means of a plurality of bolts 8 which extend through the peripheral flanges 3 and 7. Secured to the annular member 5 and held in place by the bolts 8 and nuts 8' is a frusto conical member 9 having a peripheral flange 10 through which the bolts extend. The hub 2 consists of a tubular portion 11 adapted for connection with a shaft, and having a tapered or conical portion 12 which terminates in a peripheral flange 13. The hub 1 is connected with the hub 2 by means of a series of annular plates or disks 14 connected with each other as shown in Fig. 1 so as to provide a bellows like flexible connection which will permit an angular movement of the hubs 1 and 2 with respect to each other and at the same time provide a driving connection between the two hubs. The inner edge of each disk 14 is provided with a peripheral flange 15 and the outer edge of each disk 14 is provided with an oppositely disposed outer flange 16. The disks are arranged as shown in Fig. 1 and the adjacent flanges of each disk are welded together about their entire peripheries. The disk 14 adjacent the hub 1 has its inner flange 15 welded to the peripheral flange 10' of the frusto conical member 9 and the disk 14 adjacent the hub 2 has its outer flange 16 welded to the flange 13 on the hub 2. It will be seen that these flanges, in addition to serving as a convenient means for securing the disk together, also serve to space the disks apart a sufficient distance to permit a movement of the disks with respect to each other so as to provide the flexible bellows like driving connection hereinbefore referred to. Arranged within the hub 2 is a coupling member 17 having a cylindrical portion 18 which fits within the hub 2 and is welded thereto about its entire periphery as shown at 19. The opposite end of the member 17 is in the form of a truncated sphere 20 and projects into and has a working fit within the annular member 5. The annular member 5 may be filled with a lubricant to furnish the necessary lubrication to the spherical member 20 which is the only portion of the joint which requires lubrication. It will now be clear that we have provided a flexible coupling member for forming a driving connection between two shafts and which will permit one of the shafts to be disposed at an angle to the other and which will accomplish the several objects of the invention as hereinbefore stated. Various changes may be made in the details of construction and arrangement of the several parts without departing from the spirit of our invention and it is to be understood that our invention is limited only in accordance with the scope of the appended claims.

Having thus described our invention, what we claim is:—

1. A universal joint including a flanged tubular shaft, a flanged tubular guide member having its flange adjacent the flange of said shaft, a flanged annular member encircling said guide member and having its flange adjacent the flange thereof, said flanges being concentric and bolted together, a flexible driving connection comprising a plurality of annular disks serially connected at their inner and outer edges, the inner edge of one of said disks being connected to said annular member, a second shaft carrying a flange and a ball, said ball cooperating with said guide member and said last flange being attached to one of said annular disks.

2. A universal joint including a flanged tubular shaft, a flanged tubular guide member having its flange adjacent the flange of said shaft, a flanged annular member encircling said guide member and having its flange adjacent the flange thereof, said flanges being concentric and bolted together, a flexible driving connection comprising a plurality of annular disks serially connected at their inner and outer edges, the inner edge of one of said disks being connected to said annular member, a second shaft carrying a flange and a ball, said ball cooperating with said guide member and said last flange being attached to the outer edge of one of said annular disks.

In testimony whereof, we hereunto affix our signatures.

WILLIAM J. SMITH.
HERMAN F. BRAUN.